March 6, 1956 R. H. GEORGE 2,737,588

RANDOM PULSE GENERATOR

Filed April 17, 1951 3 Sheets-Sheet 1

INVENTOR.
Roscoe H. George,
BY Brown, Jackson,
Boettcher & Dienner
Attys.

March 6, 1956 R. H. GEORGE 2,737,588

RANDOM PULSE GENERATOR

Filed April 17, 1951 3 Sheets-Sheet 2

INVENTOR.
Roscoe H. George,
BY Brown, Jackson,
Boettcher & Dienner
Attys.

March 6, 1956 R. H. GEORGE 2,737,588

RANDOM PULSE GENERATOR

Filed April 17, 1951 3 Sheets-Sheet 3

INVENTOR.
Roscoe H. George,
BY Brown, Jackson,
Boettcher & Dienner
Attys.

United States Patent Office 2,737,588

Patented Mar. 6, 1956

2,737,588

RANDOM PULSE GENERATOR

Roscoe H. George, West Lafayette, Ind., assignor to Purdue Research Foundation, Lafayette, Ind., a corporation of Indiana

Application April 17, 1951, Serial No. 221,395

10 Claims. (Cl. 250—37)

The present invention relates to an improved random pulse generator for generating random radio pulses or radio "noises." The radio pulse generator of the present invention is particularly useful for studying the performance of radio communication equipment and the like, such as radio, television and radar receivers, etc. It can also be used to calibrate random radio pulse or noise meters, and, in addiiton, can be used as a signal source in situations where the random frequency characteristic is not objectionable, or may be desirable, as for jamming purposes. A typical frequency range of my improved random pulse generator is from approximately 0.01 megacycle to beyond 80,000 megacycles.

This improved random pulse generator operates upon the mercury drop principle, in which the random pulse transmissions are generated by the dropping of mercury drops down upon the center conductor of a coaxial line or into a mercury pool which forms the bottom surface of a waveguide. The mercury drops are charged either by induction or by impact and separation from certain insulators situated within the coaxial line or waveguide. The mercury drop random pulse generator can be made to simulate random radio noise by making the number of drops produced per second in excess of the band width in cycles of the receiving device. This may be accomplished by producing a very large number of very fine streams of mercury that break up into small drops. This is limited by the requirement that sufficient charge be stored on the drops to cause the rapid rise in discharge current necessary to produce the desired frequency spectrum, and still not dissipate a large part of the energy at frequencies far in excess of the useful range. Such principle has been applied to the generation of broadband noise of both random and uniform repetition variety. The utilization of the mercury droplet generator as a source of very short duration transients lasting less than 0.0001 microsecond will be described.

The theory of a mercury drop random pulse generator can best be understood by first considering the effects of discharging a charged conducting sphere into a relatively large conducting ground plane. This can be represented electrically by two charged spheres separated by twice the distance of the sphere to the plane and moving toward each other with twice the velocity of the single sphere. As the spheres approach each other, a certain critical distance is reached at which a discharge takes place that may be either oscillatory or non-oscillatory depending on the losses. Because of the finite ionization time and the high frequency involved with small spheres, there is little chance of one-half cycle of oscillation occurring and the next half-cycle having to re-ionize the discharge path. Because of the high frequency and high damping of the discharge, the movement of the spheres relative to each other is small compared to the duration of the electrical disturbance, and therefore may be considered as stationary during the discharge. By means of the field or Maxwell equations, wherein the problem is solved in terms of field theory, the frequency spectrum as a function of sphere dimension is found, as shown in the following expression:

$$V(\omega)=B'\left[\frac{1}{\alpha-j(\omega_0+\omega)}\,\frac{1}{\alpha+j\omega_0+j\omega}\right]$$

where $$B'=l'\bar{q}\frac{\sqrt{\frac{3v(4\pi)}{32\epsilon}}}{a^2}$$

$$\omega_0=\sqrt{\frac{3v}{2a}}$$

$$\alpha=\frac{36\pi l'^2(4\pi)}{96\times 10^2 a^3}\left[ln\frac{a}{l}+2.54\right]$$

$$\epsilon=\text{dielectric constant of free space}=\frac{1}{36\pi}\times 10^{-9}$$

$\bar{q}$ is magnitude of equivalent point charges
$l'$ is distance between equivalent point charges $\bar{q}$
$l$ is distance between sphere and plane
$v$ is the potential
$a$ is the radius of the sphere This spectral relationship describes the action when a charged droplet of mercury is discharged in a mercury pool, and is the basis for the mercury droplet microwave pulse generator. The crudest form of random pulse noise generator consists of a partly filled bottle of mercury. Upon shaking the bottle, the drops of mercury which hit the sides of the bottle become charged as a result of both deformation and sliding and discharge in the main pool of mercury. This crude mechanism has been found to have a large enough output of random pulse noise over the spectrum from 0.1 to beyond 30,000 mc. to permit saturation of receivers without the use of a local oscillator. A pick-up antenna and waveguide or R. F. filter in conjunction with the mixer and I.-F. amplifier of a receiver, but without local oscillator, have proven sufficiently sensitive to easily detect the noise output.

Referring now to the accompanying drawings, in which I have illustrated two embodiments of my improved mercury drop random pulse generator:

Figure 1:
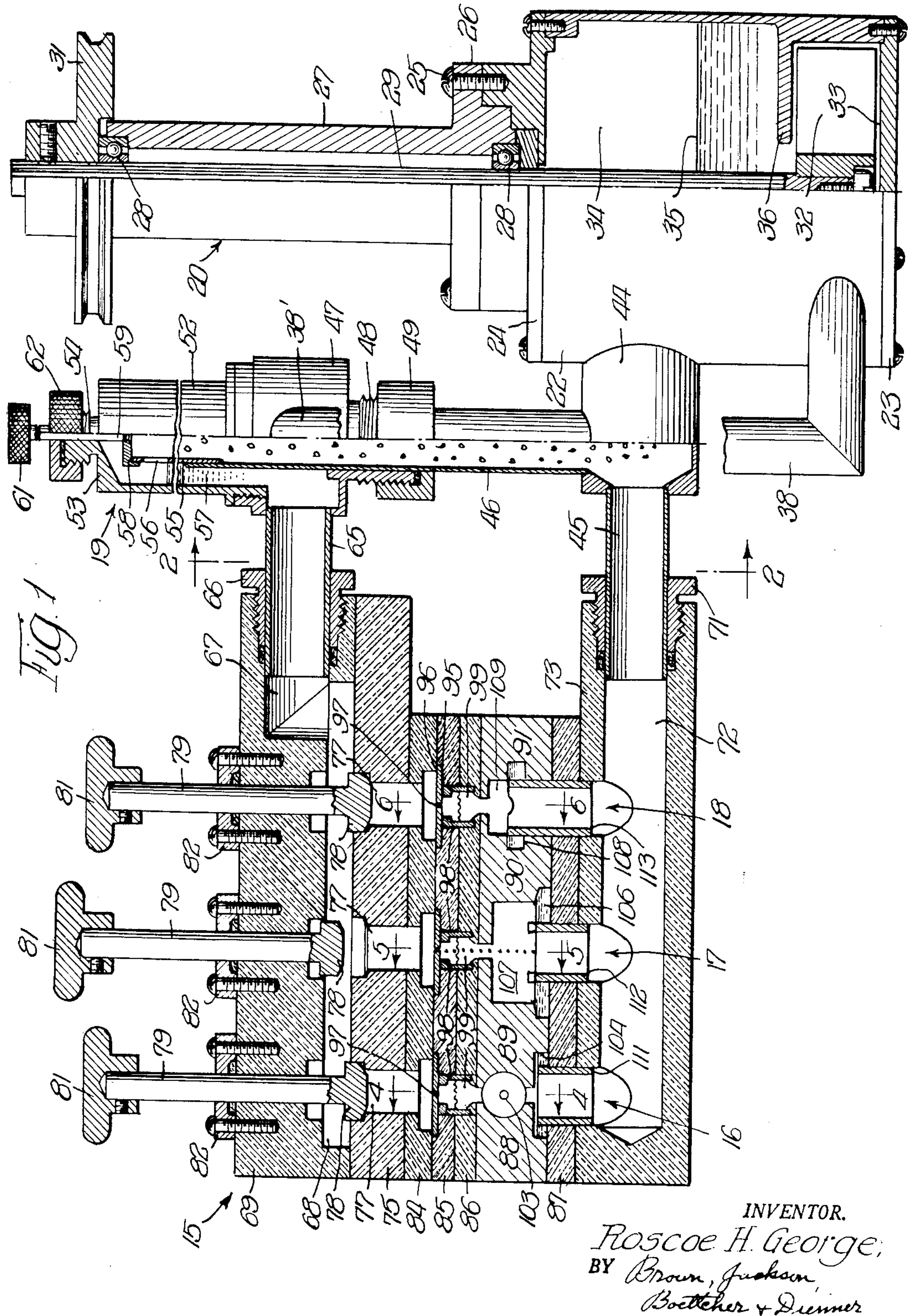
Figure 1 is a view, partly in elevation and partly in section, showing a three-channel form of mercury drop random pulse generator, and also the gravity head standpipe which supplies mercury to the random pulse generator under a gravity head, and the mercury reservoir and pump which pumps the mercury into the gravity head standpipe.

Referring to Figure 1, the random pulse noise generator is indicated in its entirety at 15 and is shown as comprising three separate noise generating channels or elements designated 16, 17 and 18 for generating three different ranges or bands of frequencies. The channel 16 at the left hand side of Figure 1 is a coaxial line type of generator for generating one range of frequencies, the intermediate channel 17 is a waveguide type of generator for generating a higher range of frequencies, and the channel 18 at the right hand side is for generating a still higher range of frequencies. The mercury is supplied to these three channels from a gravity head standpipe, indicated in its entirety at 19, and this in turn is supplied with mercury from a combined mercury reservoir and pump unit, indicated at 20.

Figure 2:
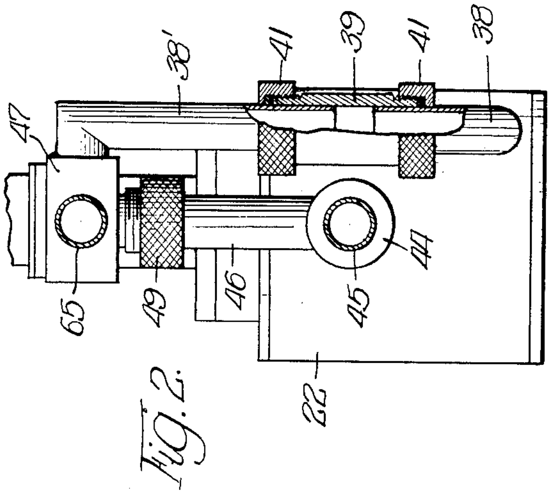
Figure 2 is a fragmentary sectional view on a smaller scale, taken approximately on the plane of the line 2—2 of Figure 1.
Figure 7:
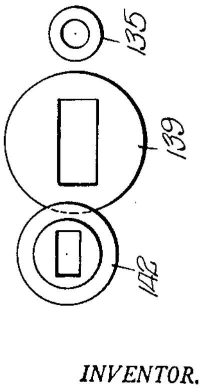
Figure 7 is an end view of the coaxial cable and waveguide channels.

Referring now to the details of this latter unit 20, it comprises a generally cylindrical reservoir chamber 22 closed at the bottom by a removable end head 23 and at the top by a removable end cap 24. Secured to the end cap 24 by screws 25 is the lower flange 26 of a tubular bearing standard 27 which affords a support for widely spaced bearings 28 in which is mounted a vertical axial shaft 29. A drive pulley 31 is secured to the upper end of the shaft for receiving a belt drive from any suitable source of power. Secured to the lower end of the shaft 29 is a rotary impeller 32 which rotates in a centrifugal impeller chamber 33 defined in the lower portion of the housing 22. The upper portion of the housing 22 constitutes a mercury reservoir 34 for containing a reserve quantity of mercury 35. A horizontal partition 36 separates the impeller chamber 33 from the reservoir 34, except at a central opening around the shaft, which permits the mercury to flow down into the impeller chamber. The impeller 32 may be driven at any suitable speed, depending upon the height of the gravity head standpipe 19 and other proportions, but as illustrative of one satisfactory embodiment of the invention, I have driven the impeller at a speed of approximately 1000 R. P. M. The mercury discharged centrifugally from the pump chamber 33 is conducted through a supply duct 38 leading substantially tangentially from the chamber 33, and thence extending upwardly alongside of the standpipe assembly 19, as shown in Figure 2. As shown in this figure, the supply duct 38 is provided with a separated upper section 38′, between which is interposed a metal sleeve 39 secured to the separated duct sections by sealing ring ferrules 41, 41. The provision of the metal sleeve 39 permits adjustment of the effective length of tube 38, 38′ and cooperates with the packing gland 49 to compensate for slight differences in the spacing between manifolds 67 and 72. The metal sleeve 39 also facilitates assembly and disassembly of the members.

Opening into the side of the reservoir chamber 34 at a point above the normal mercury level therein is a boss 44 through which mercury is returned to the reservoir by way of a return pipe 45 leading from the discharge manifold of the pulse generator 15, as I shall later describe. Extending upwardly from the upper side of the boss 44 is a tube 46 functioning as a return pipe for receiving the overflow of mercury beyond that necessary to maintain a desired gravity head. Surrounding the upper portion of the tube 46 is a supply fitting 47 provided with a lower threaded boss 48 which has a snug fit over the tube 46. A gland nut and sealing ring 49 screw over this threaded boss for preventing leakage down along the outside of the tube 46. Screwing into a threaded boss at the upper end of the fitting 47 is a sleeve 52 having a closed upper end 53 terminating in a threaded boss 54. Mounted for a snug sliding fit within the upper end of the tube 46 is an extension tube 55 having one or more overflow spill apertures 56 adapted to open into the space 57 above the top edge of the tube 46. The extension sleeve 55 carries a cap 58 from which an actuating rod 59 extends upwardly through the threaded upper boss 54. A knurled actuating head 61 on the upper end of the rod 59 enables the extension sleeve 55 to be adjusted upwardly or downwardly in order to dispose the overflow spill aperture 56 at any desired height within the annular space 57. A gland nut and sealing ring 62 screw over the threaded boss 54 for preventing the escape of mercury vapor around the actuating rod 59. The upper section 38′ of the supply duct 38 enters the side of the supply fitting 47, so that the mercury impelled upwardly by the pump 32 is discharged in the annular space 57 and tends to rise therein to a predetermined spill-over level established by the setting which has been given to the aperture 56 by the vertical adjustment of the extension sleeve 55. It will be seen that this mercury level thus established by the setting of the aperture 56 predetermines the gravity head of the mercury which is supplied to the pulse generator 15. The mercury which spills back through the aperture 56 falls down through the standpipe 46 and returns to the mercury reservoir 34. As will be hereinafter described more completely, any entrained air tending to accumulate in the annular space 57 above the gravity head level of the mercury has free venting discharge through the spill aperture 56 and down through the standpipe 46, and thence into the reservoir chamber above the mercury level 35. The upper part of the reservoir chamber 34 has free communication with the atmosphere through the hollow bearing standard 27, a heavy felt pad saturated with a heavy oil or light grease being utilized to prevent contact of the mercury with the ball bearings.

The head of mercury thus maintained in the standpipe assembly 19 is transmitted to the random pulse generator 15 through a supply pipe 65 extending laterally from the supply fitting 47. The other end of this supply pipe 65 is connected through a gland nut and sealing ring 66 with passageways 67 and 68 formed in a supply manifold block 69, preferably composed of a suitable transparent material, such as "Plexiglas." The mercury return pipe 45 is also connected by a gland nut and sealing ring 71 with a discharge passageway or manifold 72 formed in the discharge manifold block 73, also composed of "Plexiglas." Secured to the under side of the supply manifold block 69 to close the passageway 68 is a plate 75, also preferably composed of the same or a similar insulating material. Extending downwardly through this plate 75 in alignment with the three mercury drop channels 16, 17 and 18 are supply passages 77 which are adapted to have their upper ends closed by valves 78. These valves are carried at the lower end of sliding stems 79 extending up through the manifold block 69 and carrying actuating knobs 81 at their upper ends. Gland packing caps 82 may be secured to the top surface of the manifold block 69 for securing suitable sealing rings around the stems 79. When the valves 78 are in their lower closed positions, illustrated in Figure 1, the head of mercury in the passageway 68 is prevented from flowing down through the port openings 77, into the mercury drop channels. By pulling upwardly selectively on either one of the knobs 81, the corresponding valve 78 is moved upwardly into an open position for permitting the mercury to flow down through the supply port 77 into the mercury drop channel of that particular pulse generator.

The mercury drop channels are built up of a stack of plates 84, 85, 86 and 87 all composed of insulating material, and by a series of parallel metal bars 88, 89, 90 and 91 disposed in spaced relation between the insulating plates 86 and 87. Plates 84 and 87 may be a metal structure whenever weight of the apparatus is not a factor. This laminated stack of insulating plates and parallel metal bars are rigidly fastened together by screws 94*b* which pass through the plates and bars and thread into the bottom plate 87 of the stack to clamp the various parts in place, as clearly shown in the plan view of Figure 3. The ends are closed by means of the end plates 92 and 93 which are fastened by screws 94*a*. In order to prevent leakage of mercury, gaskets of polyethylene 0.01 to 0.02 inch thick are placed under the end plates as shown. The polyethylene windows in the wave guide prevent the mercury from spilling out into the wave guide but do not interfere with the radiation of the noise transients into the waveguide. As will be seen from these figures and from Figure 3, the manifold block 69 and its closure plate 75 are fastened to the top side of this laminated assembly at one end of the noise generator, and the other manifold block 73 is secured to the under side of this assembly at the same end. The upper insulating plate 84 is formed with circular ports 77′ which register with the valve controlled supply ports 77. The lower ends of these ports open into longitudinal channels 94 which are formed on the under side of the insulating plate 84 and extend almost the entire length thereof, as clearly shown in Figures 4–6. The opposing upper surface of the next lower insulating plate 85 is formed with shallow flat recesses 95 in which are seated the apertured plates 96 for effecting the mercury drop type of discharge. It will be noted that the long channel-shaped passageway 94 distributes the mercury along the entire top side of each apertured plate 96. The apertures 97 in these plates are preferably arranged in a straight line down the middle of the plate and are preferably of relatively small size, such as the hole made by a Number 80 drill, there being as high as 20 holes to the inch along the length of this apertured plate 96. I have found that it is preferable to make this plate 96 of nickel to avoid corrosion, prevent alloying of the mercury with it, and also to simplify accurate drilling operations.

As the mercury drops discharge down from the apertures 97 in each of the apertured plates 96 they pass between two laterally spaced charging plates 98 defining the sides of the charging zone or channel 99. The top edges of these charging plates 99 set in grooves formed in the insulating plate 85, and the bottom edges of said charging plate set in grooves formed in the next lower insulating plate 86.

After passing through the charging zone between the charging plates 98, and receiving the charge therefrom, the mercury drops pass downwardly into the pulse generating channel defined between the laterally spaced parallel bars 88, 89, 90 and 91. The opposing faces of the two bars 88 and 89 define a coaxial line type of generator characterized by a substantially cylindrical outer conducting surface and an inner conductor 103 extending axially thereof. The mercury drops strike the coaxial inner conductor 103 and impart their charges therethrough, thereby transmitting radio noise along the coaxial pulse generator. From the open lower side of this coaxial generator, the mercury drops fall into a mercury pool 104 defined between the upper side of insulating plate 87 and notched areas in the under sides of metal bars 88 and 89.

Referring to the waveguide form of channel 17, the charged mercury drops fall directly into a mercury pool 106 similarly formed between the upper surface of the insulating plate 87 and notched areas formed in the bars 89 and 90. These notched areas define a waveguide 107 of relatively large sectional area.

Referring now to the other waveguide channel 18, the mercury drops also fall into a mercury pool 108 in this channel, but this mercury pool is at a higher level, and the defined waveguide 109 is of smaller sectional area.

Leading downwardly from the mercury pool in each pulse generating channel are the mercury outlet tubes 111, 112 and 113, each of which passes down through the insulating plate 87 and through the top of the manifold block 73 for opening into the outlet manifold passageway 72. In order to maintain an air passage through these outlet tubes 111, 112, and 113, the mercury stream should be broken at one or more points around the edge of the outlet where the mercury pool spills over into the outlet tube. In the case of the coaxial line channel 16 and the small waveguide channel 18, this is accomplished by the close proximity of the sides of the channel with the outlet tubes. Since the mercury has a very high surface tension, it does not flow through these narrow openings with the small pressure head existing. In the case of the larger waveguide 107, small projections extend up from the upper edge of the outlet tube 112 above the mercury level, which projections break the mercury stream and allow the air to leak through at this point. It will be understood that the mercury pools 104, 106 and 108 extend the entire length of the associated apertured plate 96 for receiving the mercury drops from all the apertures along the length of each plate.

Figures 4, 5:
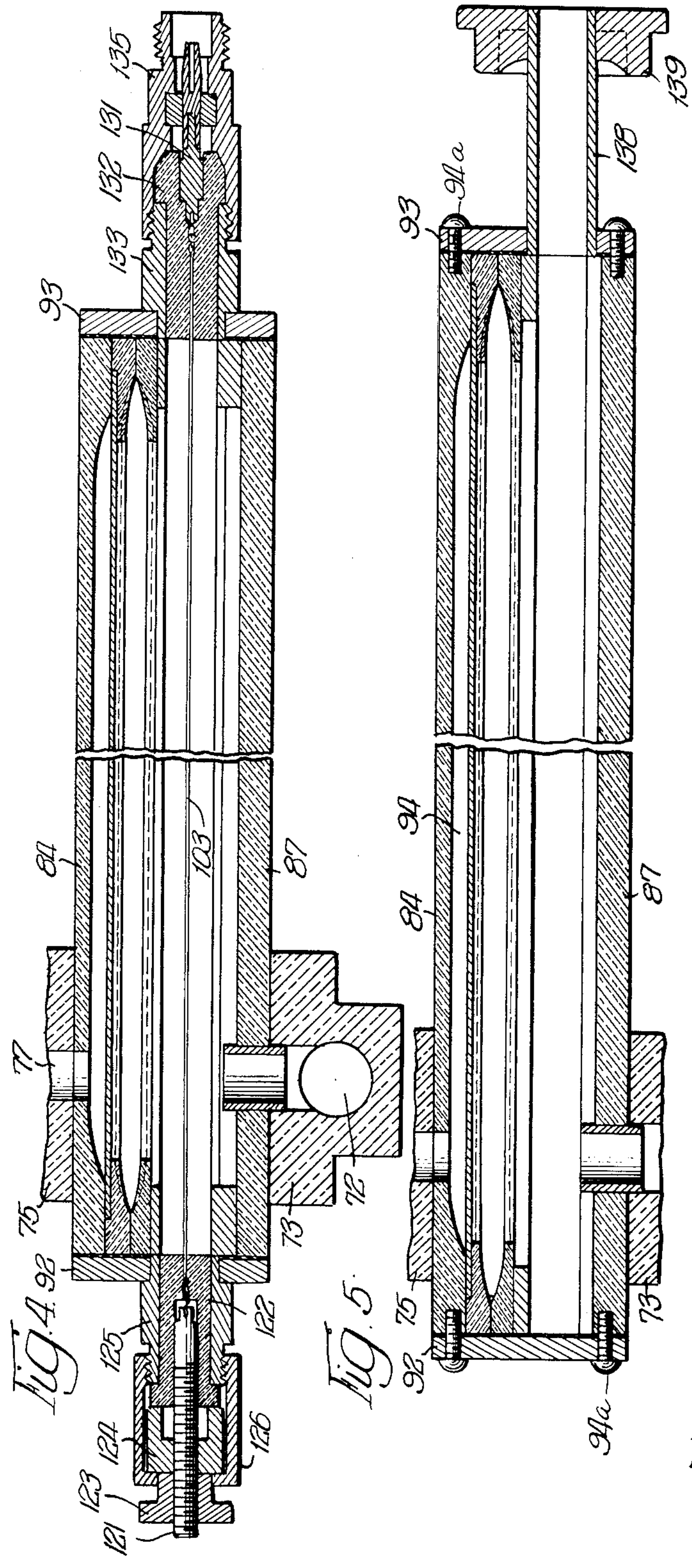
Figure 4 is a longitudinal sectional view taken approximately on the plane of the line 4—4 of Figure 3, illustrating that channel of the random pulse noise generator which is in the form of a coaxial line generator.
Figure 5 is a longitudinal sectional view taken approximately on the plane of the line 5—5 of Figure 3, illustrating the intermediate channel of the random pulse generator which is in the form of a waveguide for generating one range of microwave frequencies.

Figure 4 illustrates the manner of supporting the central conductor 103 at the ends of the coaxial line generator. This central conductor preferably consists of a length of nickel wire having its left hand end anchored to an adjusting screw 121 composed of "Bakelite" or the like. This adjusting screw is guided in an insulating bushing 122 and is adapted to be held taut by a knob 123 screwing over the adjusting screw and abutting a block 124 which bears against the outer end of the insulating bushing 122. The headed outer end of this insulating bushing bears against the end of a mounting sleeve 125 seated in the end closure plate 92. Bushing 122 is fixedly positioned by ferrule 126 which effectively seals the joint between the headed section of bushing 122 and sleeve 125 to prevent the leakage of mercury therethrough, Axial conductor 103 fits snugly into the hole in bushing 122 and the bushing 132 as an added safeguard against mercury escape. The other end of the conducting wire 103 is secured to an anchor 131 seated in an insulating bushing 132 which is carried by a mounting sleeve 133 projecting from the closure head 93. A suitable connector coupling 135 screws over the threaded outer end of the mounting sleeve 133 and is adapted to effect coupling with any conventional coaxial conductor for conducting the generated random pulses to the desired point of use.

Referring to Figure 5, the large waveguide channel 107 is adapted to effect coupling with the point of use through a waveguide extension 138 projecting from the end closure plate 93 in alignment with the waveguide channel 107. A polyethylene gasket extends across the waveguide opening forming a window through which the pulse transients are radiated, the gasket thus precluding possible contact of the mercury with the output waveguides. In the case of the coaxial line the gasket is cut away over the end of parts 122 and 132 to prevent entry of the mercury through the hole around the wire and short circuiting of the line thereby. A conventional connector coupling 139 is provided on the outer end of this waveguide extension 138.

Figure 6:
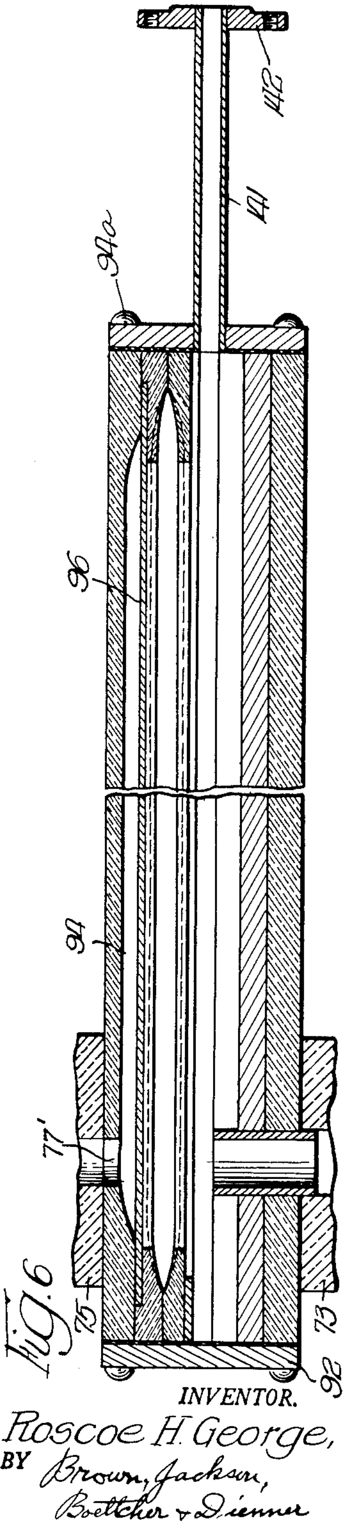
Figure 6 is a longitudinal sectional view taken approximately on the plane of the line 6—6 of Figure 3, illustrating the third channel of the random pulse generator which is in the form of a waveguide for generating another range of microwave frequencies.

Referring to Figure 6, the smaller waveguide channel 109 is provided with a waveguide extension 141, also projecting from the end closure plate 93 in alignment with the channel 109. A suitable connector coupling 142 is also provided on the outer end of this waveguide extension 141.

Figure 3:
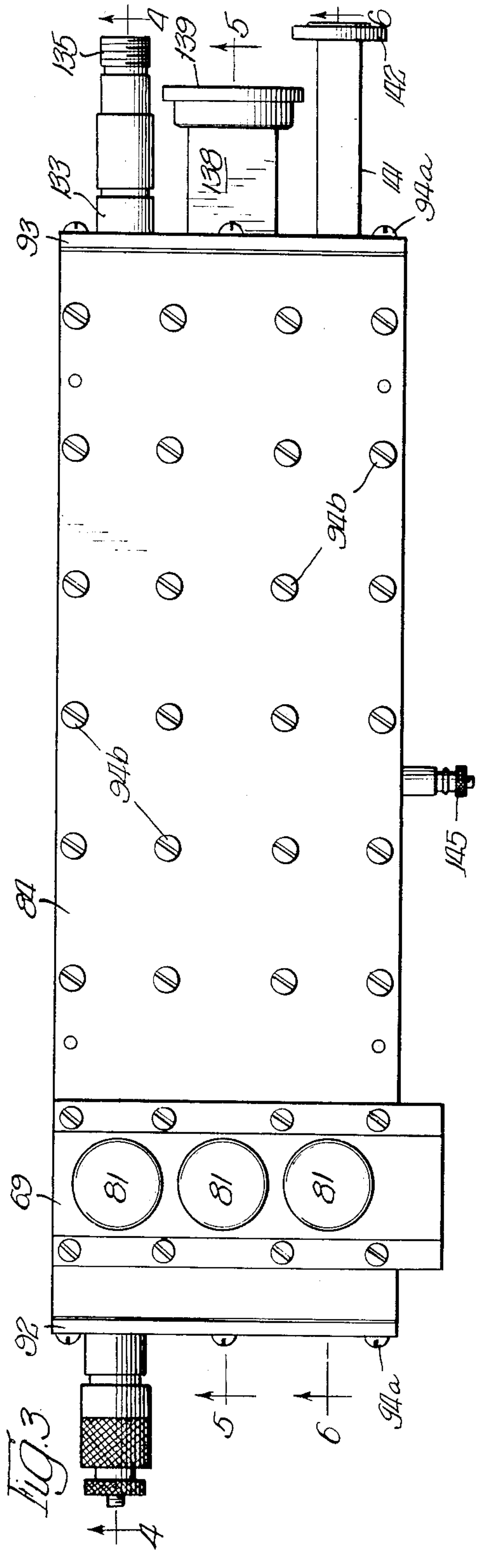
Figure 3 is a plan view of the three-channel random pulse noise generator.

The charging voltage is applied to the external terminal 145 projecting laterally from the side of the noise generator, as shown in Figure 3. The inner end of this terminal 145 is electrically connected with one of the charging plates 98 by means of a suitable tungsten spring, and the other five plates are suitably connected to this first charging plate 98, such as by means of small tungsten springs which slip over a supporting rod that passes through small holes in the end of each charging plate 98. It will be understood that this is merely illustrative, and that the plates may be connected with the charging terminal 145 in any suitable manner. The charging voltage may be varied from zero to a point where sparkover to the mercury stream occurs. A 10 to 20 megohm resistance is connected in series with the high voltage power supply to limit the current in case of sparkover. The general range of operating voltages is of the order of 500 to 2500 volts.

In order to make the mercury pool at the bottom of each coaxial or waveguide channel as flat as possible, the channel for holding the mercury pool is made wider on each side than the radius of curvature of the mercury meniscus. The corners of the metal at the bottom of the waveguide make contact with the mercury by pressing into its surface slightly. This results in only a slight curvature of the mercury across the bottom of the waveguide.

One of the problems involved in the design of a mercury circulating system of this type is that air may be pumped out of the waveguide, for example, and this air may tend to accumulate in the channel areas 94 of plate 84, and may also tend to accumulate in the intake manifold passageways 67 and 68. Therefore, it is important that means be provided for the escape of air from one part of the system to another. For example, the discharge manifold 72 must be large enough so that it never runs full of mercury and closes the air passage between the waveguide or coaxial line and the air chamber over the mercury level 35 in the reservoir 34. For the same reason, the passageways in plate 84 are so constructed that air is free to vent therefrom through supply pipe 65 and annular space 57 into the spillover port 56 and thence down through standpipe 46 into the reservoir chamber area 34. The supply pipe 65 and the height of the manifold passageway 67 is such that air bubbles can always escape therethrough along the top surface of the mercury counter to the incoming flow of the mercury. This may be helped by cutting very narrow saw slots in the tops of these passages. These slots should be 1/64 inch or less in width, so that the surface tension of the mercury will prevent it from closing the slots completely, so as to allow the air to leak along the top portions of the slots. This pumping of air in the system is probably caused by small air bubbles being formed in the mercury when the mercury drop strikes the mercury surface of the pool, such air bubbles being carried along through the system. It is important to avoid the trapping of air at various points in the system, because this can cause uneven flow of the mercury, with resulting fluctuations of the random pulse noise output.

All parts of the mercury system should be made of metals which do not alloy with mercury, or should be electroplated with such metal. For this reason, I find it preferable to construct most of the metal parts of steel or stainless steel. In order to reduce the high frequency losses in the steel walls of the coaxial line end of the waveguides, these parts are preferably chromium plated. The chromium metal reduces the losses to about the same value as for aluminum, but also protects the surfaces against rust.

Referring now to the operation of this embodiment employing electrically charged plates 98, as the mercury streams which are grounded pass in between the two charged plates 98, the electric field between these plates and ground induces a charge on the end of each stream of mercury. The mercury streams break into droplets while in this field, and discharge.

In the case of the coaxial line noise generator 16, we are not interested in this embodiment in generating noise at frequencies much in excess of 10K mc. Therefore, this coaxial line generator is designed with a very small center conductor 103, so that most of the bound charge induced by the presence of the charged mercury drops will reside on the inside of the outer conductor of the line at the instant the drop discharges into the center conductor. Under these conditions, when the drop discharges into the center conductor, the bound charge on the outer conductor is stranded, so that a steep front travelling wave moves out in both directions along the line from the point of discharge, and this constitutes most of the useful energy of the noise transient. The small amount of radiated energy from the discharge of the bound charge on the center of the drop is too high a frequency to be transmitted by the coaxial line and is largely lost.

In the case of the waveguide noise generators 17 and 18, the output is increased by closing one end of the waveguide and reflecting the energy back out of the other end. In the case of the coaxial line pulse generator 16, the energy travelling to the open end of the line is also reflected.

In order to approximate true random pulse noise, the number of discharges per second should be very high. The pulse generator illustrated has approximately 200 mercury streams to each unit 16, 17 and 18, and under normal operation each stream is capable of producing about 1000 drops per second, or a total of 200,000 drops per sound. The effective number is increased still further by the reflected waves which occur at a slightly later time than the direct radiation in the case of the waveguide pulse generators. The effective number of transients could be increased still further if it were practical to delay the reflections still further. It is obvious that for testing the charge stranded on the drop is carried down and discharges either into the pool of mercury at the bottom of the waveguide, or into the center conductor 103 of the coaxial line channel. Let us first consider the case of the mercury drop entering the waveguide 107 or 109 and discharging into the mercury pool at the bottom of this waveguide. As the drop moves slowly compared to the velocity of propagation of the electric field it induces a charge of opposite polarity on the sides at the slot in the top of the waveguide. As the drop falls through the waveguide, part of the charge moves along and finally concentrates in a small area immediately under the approaching drop. Only a small part of the bound charge remains on the top and side walls of the waveguide, depending on the dimensions of the waveguide and the relative capacitance between the drop and the various surfaces. If the waveguide is large or high compared with the diameter of the drop, most of the energy is radiated from the discharge of a small sphere to a plane. However, since the radiation resistance of a sphere to a plane is so very high, the discharge is highly damped and therefore contains a very wide range of frequencies. If the discharge is at all oscillatory, then the peak output should occur at a wavelength $\lambda_0=2\pi D/\sqrt{3}=3.63D$, where D is the diameter of the mercury drop. The mean diameter of the drops formed in normal operation of this noise generator is between 0.020 and 0.025 inch, in which case the maximum output should occur at approximately 145K mc. The small amount of bound charge on the walls of the waveguide set up traveling waves at the instant of discharge which are much lower in frequency and which contribute to the output near the cut-off frequency of the waveguide. If the height of the waveguide is decreased in the pulse generator, the amount of bound charge on the top of the waveguide will be increased and the low frequency energy is increased at the expense of the energy in the sphere to plane equipment having output amplifiers capable of passing frequencies of a megacycle or more, the number of drops per second would have to be increased by 5 or 10 times to simulate true random noise.

Figure 8:
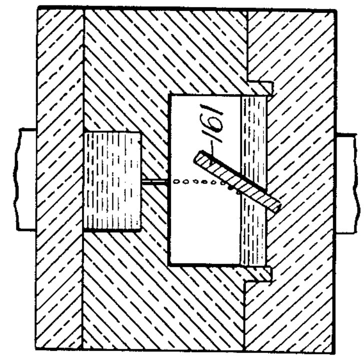
Figure 8 is a diagrammatic sectional view of a modified embodiment of the invention.

In Figure 8 I have illustrated a modified embodiment of the invention which is self-generating in the sense that no charged plates are necessary to establish the charges on the mercury drops. In this embodiment, the mercury drops are discharged through small holes in an apertured plate, substantially as above described, but these mercury drops impinge upon an inclined dielectric plate 161 before entering the mercury pool.

The charging of mercury drops by this method probably starts off as a contact and separation charging phenomenon, and after a short period of operation may develop into a combination of induction charging and contact and separation charging. The very high surface tension characteristics of the heavy conducting liquid mercury are important to the charging operation of this embodiment. As a small mercury drop strikes the inclined plane 161, the stored kinetic energy effects a flattening of the mercury drop and causes the drop to make intimate contact with a considerable area of the insulator. The difference in electron affinity thereof causes a transfer of electrons between the two surfaces during such period of contact, and as a result of the high surface tension characteristics of the liquid mercury, it immediately begins to draw away from the insulator into an approximate sphere. As the mercury draws away, a charge is left stranded on the insulator member. At the time of contact between the mercury and the insulator, a small difference in contact potential may exist and the capacitance may be of a comparatively high value. However, as the capacitance is reduced, the potential may reach an extremely high value, and as the mercury drop discharges into the pool of mercury, a very strong transient is generated.

If the charge on the insulator is dissipated before the next drop strikes, the above phenomenon is repeated. If it does not dissipate, a charge is induced on the end of the stream and the next drop is charged even before it strikes the insulator. Thus, after a short period of operation the charging of the mercury may be effected by a combination of induction charging and contact and separation charging. In other respects, the construction and operation of this modified embodiment of noise generator is substantially the same as that described above of the electrically charged embodiment.

It will be understood that the inclined deflecting plate 161 extends substantially the entire length of the noise generating channel or waveguide, so that all of the mercury drops from the entire row of apertures 97 impinge thereon. This self-charging embodiment is particularly useful in situations where electrical power is not available. The mercury pump can be operated by hand.

While I have illustrated and described what I regard to be the preferred embodiments of my invention, nevertheless it will be understood that such are merely exemplary and that numerous modifications and rearrangements may be made therein without departing from the spirit and scope of the invention.

I claim:

1. In a random pulse generator for generating pulses in the frequency ranges described, the combination of a channel comprising a coaxial line generator having concentric outer and inner conductors, a mercury supply duct extending lengthwise of the upper portion of said channel including means for emitting mercury drops into said coaxial line generator at distributed points along its length, means for establishing charges in said mercury drops, which charges are utilized to generate pulses in said coaxial line generator, and an outlet duct extending lengthwise of the lower portion of said channel for receiving the mercury drops after passing through said coaxial line generator.

2. In a random pulse generator for generating pulses in the frequency ranges described, the combination of a channel comprising a coaxial line generator having concentric outer and inner conductors, a mercury supply duct extending lengthwise of the upper portion of said channel including aperture means for causing mercury drops to fall downwardly against the center conductor of said coaxial line generator at distributed points along its length, charging means for charging said mercury drops before their entrance into said coaxial line generator, an outlet duct extending lengthwise of the lower portion of said channel for receiving the mercury drops in the lower portion of said coaxial line generator, and means for circulating the mercury from said outlet duct back to said supply duct.

3. In a random pulse generator for generating pulses in the frequency ranges described, the combination of a channel comprising a waveguide, a mercury supply duct extending lengthwise of the upper portion of said channel including means for causing mercury drops to fall into said waveguide at distributed points along its length, electrical charging means for charging said mercury drops before they enter said waveguide, means for collecting a pool of mercury extending lengthwise of the lower portion of said channel, said charged drops generating pulses in the aforementioned frequency ranges substantially upon effective contact with the mercury pool, and means for circulating the mercury from said pool back to said mercury supply duct.

4. In a random pulse generator, the combination of a plurality of pulse generating channels, one of said channels being in the form of a coaxial line generator having concentric outer and inner conductors, another of said channels being in the form of a waveguide, mercury supply ducts extending lengthwise of the upper portions of said channels including means for emitting mercury drops downwardly into said channels at distributed points along their lengths, charging means for charging said mercury drops, an outlet duct extending lengthwise of the lower portion of each channel for receiving the mercury drops, means for circulating the mercury from said outlet ducts back to said supply ducts, and valve means for controlling the flow of mercury to said supply ducts.

5. In a random pulse generator of the class described, the combination of a substantially horizontal resonant channel having relatively long narrow dimensions to determine the output frequencies of the random pulses generated therein, a mercury channel having closed bottom and side walls to confine a pool of mercury extending substantially the entire length of the bottom of said resonant channel, a mercury supply duct extending lengthwise of and above said resonant channel, a row of apertures in the bottom wall of said mercury supply duct for dropping mercury drops in a row into said resonant channel, means for charging the mercury drops before they contact the mercury pool, which charges are effective to generate random pulses in said resonant channel, circulating apparatus for circulating the mercury from said pool back to said supply duct, and tubular coupling means at one end of said resonant channel for establishing coupling connection with a tubular conductor extending to a point of utilization of said random pulses.

6. In a random pulse generator of the class described, the combination of a substantially horizontal resonant channel having relatively long narrow dimensions to determine the output pulse frequencies of the random pulses generated therein, a mercury channel having closed bottom and side walls to confine a long narrow pool of mercury extending substantially the entire length of the bottom of said resonant channel, a mercury supply duct extending lengthwise of and above said resonant channel, a row of apertures in the bottom wall of said mercury supply duct for dropping mercury drops in a row into said resonant channel, an electrically energized charging plate extending longitudinally of said row of apertures for charging the mercury drops as they issue from said row of apertures, which charges are effective to generate random pulses in said resonant channel, circulating apparatus for circulating the mercury from said pool back to said supply duct, and tubular coupling means at one end of said resonant channel for establishing coupling connection with a tubular conductor leading to a point of utilization of said random pulses.

7. In a random pulse generator of the class described, the combination of a substantially horizontal resonant channel, a coaxial inner conductor in said resonant channel to establish a coaxial line type of resonant channel, said resonant channel having relatively long narrow dimensions to determine the output pulse frequencies of the random pulses generated therein, a mercury channel having closed bottom and side walls to confine a long narrow pool of mercury extending substantially the entire length of the bottom of said resonant channel, a mercury supply duct extending lengthwise of and above said resonant channel, a row of apertures in the bottom wall of said mercury supply duct for dropping mercury drops in a row into said resonant channel, an electrically energized charging plate extending longitudinally of said row of apertures for charging the mercury drops as they issue from said row of apertures, which charges are effective to generate random pulses in said resonant channel when said drops strike said coaxial inner conductor, circulating apparatus for circulating the mercury from said pool back to said supply duct, and tubular coupling means at one end of said resonant channel for establishing coupling connection with the tubular conductor leading to a point of utilization of said random pulses.

8. In a random pulse generator of the class described, the combination of first and second pulse generating resonant channels, the first of said channels being in the form of a coaxial line type of pulse generating channel having concentric outer and inner conductors, the second of said channels being in the form of a wave guide, each of said channels being of relatively long narrow dimensions to determine the output pulse frequencies of the random pulses generated therein, first and second mercury channels associated with said first and second resonant channels, each of said mercury channels having closed bottom and side walls to confine a pool of mercury extending substantially the entire length of the bottom of its respective resonant channel, mercury supply ducts extending lengthwise and above said first and second resonant channels, rows of apertures in the bottom walls of said mercury supply ducts for dropping mercury drops in rows into said first and second channels, an electrically energized charging plate extending longitudinally of each row of apertures for charging the mercury drops as they issue from said row of apertures, which charges are effective to generate random pulses in said first and second resonant channels, circulating apparatus for circulating the mercury from the pools of said first and second mercury channels back to said supply ducts, a coaxial line type of coupling means at one end of said first pulse generating channel, and a wave guide type of coupling means at one end of said second pulse generating channel.

9. In a random pulse generator of the class described, the combination of a substantially horizontal resonant channel having relatively long narrow dimensions to determine the output frequencies of the random pulses generated therein, a mercury containing channel having closed bottom and side walls to confine a pool of mercury extending substantially the entire length of the bottom of said resonant channel, a mercury supply duct extending lengthwise of and above said resonant channel, a row of apertures in the bottom wall of said mercury supply duct for dropping mercury drops in a row into said channel, a pair of electrically energized charging plates extending longitudinally of said row of apertures on opposite sides thereof for charging the mercury drops as they issue from said row of apertures, which charges are effective to generate random pulses in said channel, a mercury reservoir receiving mercury from an overflow level of said mercury pool, a pump drawing mercury from said reservoir, and a gravity head standpipe receiving mercury from said pump and connected to supply mercury under a gravity head to said mercury supply duct.

10. In a random pulse generator of the class described, the combination of a substantially horizontal resonant channel having relatively long narrow dimensions to determine the output frequencies of the random pulses generated therein, said resonant channel having closed bottom and side walls to confine a pool of mercury extending substantially the entire length of the bottom of said resonant channel, a mercury supply duct extending lengthwise of and above said resonant channel, a row of apertures in the bottom wall of said mercury supply duct for dropping mercury drops in a row into said resonant channel, an inclined surface extending lengthwise in said channel against which said mercury drops strike before entering said mercury pool for creating charges on said drops, which charges are utilized to generate random pulses in said channel, and tubular coupling means at one end of said channel for establishing coupling connection with a tubular conductor leading to a point of utilization of said random pulses.

References Cited in the file of this patent

UNITED STATES PATENTS

| | | |
|---|---|---|
| 2,078,760 | Hansell | Apr. 27, 1937 |
| 2,270,479 | Schroter | Jan. 20, 1942 |
| 2,601,226 | Schmitt | June 24, 1952 |